United States Patent
Chen et al.

(10) Patent No.: US 12,423,582 B2
(45) Date of Patent: *Sep. 23, 2025

(54) APPARATUS AND METHODS FOR TRAINING IN CONVOLUTIONAL NEURAL NETWORKS

(71) Applicant: Cambricon Technologies Corporation Limited, Beijing (CN)

(72) Inventors: Yunji Chen, Beijing (CN); Tian Zhi, Beijing (CN); Shaoli Liu, Beijing (CN); Qi Guo, Beijing (CN); Tianshi Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 1191 days.

This patent is subject to a terminal disclaimer.

(21) Appl. No.: 16/709,968

(22) Filed: Dec. 11, 2019

(65) Prior Publication Data

US 2020/0111007 A1    Apr. 9, 2020

Related U.S. Application Data

(63) Continuation of application No. 16/174,165, filed on Oct. 29, 2018, now Pat. No. 10,643,129, which is a
(Continued)

(30) Foreign Application Priority Data

Apr. 29, 2016  (CN) .......................... 201610283838.5

(51) Int. Cl.
*G06N 3/084* (2023.01)
*G06F 7/544* (2006.01)
*G06N 3/08* (2023.01)

(52) U.S. Cl.
CPC ........... *G06N 3/084* (2013.01); *G06F 7/5443* (2013.01); *G06N 3/08* (2013.01)

(58) Field of Classification Search
CPC .......... G06F 13/362; G06F 17/16; G06F 9/30; G06F 9/3001; G06N 3/0454; G06N 3/063
See application file for complete search history.

(56) References Cited

U.S. PATENT DOCUMENTS 5,204,938 A * 4/1993 Skapura .................... G06N 3/10
706/42
9,153,230 B2 * 10/2015 Maaninen ............... G10L 15/16
(Continued)

FOREIGN PATENT DOCUMENTS

CN       103150596 A     6/2013
CN       104103033 A     10/2014
(Continued)

OTHER PUBLICATIONS

CN202010615117.6—First Office Action mailed on May 15, 2023, 20 pages. (With Brief English Explanation).
(Continued)

*Primary Examiner* — Luis A Sitiriche
(74) *Attorney, Agent, or Firm* — Getech Law LLC; Jun Ye (57) ABSTRACT

Aspects for backpropagation of a convolutional neural network are described herein. The aspects may include a direct memory access unit configured to receive input data from a storage device and a master computation module configured to select one or more portions of the input data based on a predetermined convolution window. Further, the aspects may include one or more slave computation modules respectively configured to convolute one of the one or more portions of the input data with one of one or more previously calculated first data gradients to generate a kernel gradient, wherein the master computation module is further config-
(Continued)

ured to update a prestored convolution kernel based on the kernel gradient.

20 Claims, 7 Drawing Sheets

Related U.S. Application Data continuation-in-part of application No. PCT/CN2016/081088, filed on May 5, 2016.

(56) References Cited

U.S. PATENT DOCUMENTS

| | | | | |
|---|---|---|---|---|
| 2012/0300988 | A1* | 11/2012 | Ivanov | G06V 40/13 382/115 |
| 2014/0313339 | A1* | 10/2014 | Diessner | G06T 7/246 348/148 |
| 2015/0100530 | A1 | 4/2015 | Mnih et al. | |
| 2015/0294219 | A1* | 10/2015 | Krizhevsky | G06N 3/045 706/25 |
| 2016/0026912 | A1 | 1/2016 | Falcon et al. | |

FOREIGN PATENT DOCUMENTS

| | | |
|---|---|---|
| CN | 104537393 A | 4/2015 |
| CN | 105512723 A | 4/2016 |
| WO | 2017185391 A1 | 11/2017 |

OTHER PUBLICATIONS

EP 16899902.7—European Search Report, mailed Nov. 25, 2019, 5 pages.
Ramon J. Aliaga, et al., "System-on-Chip Implementation of Neural Networking Training on FPGA", International Journal on Advances in Systems and Measurements, 2009, 12 pages.
Pedro O. Domingos, et al., "An Efficient and Scalable Architecture for Neural Networks with Backpropagation Learning", IEEE 2005, 6 pages.
EP 16899902.7—Communication Pursuant to Article 94(3) EPC, mailed Feb. 24, 2020, 9 pages.
EP 16899902.7—Response to Communication Pursuant to Article 94(3) EPC, filed Jun. 24, 2020,36 pages.
Timo Hamalainen, et al., "TUTNC: A General Purpose Parallel Computer for Neural Network Computations", 1995 Elsevier Science B.V., 19 pages.
Harri Klapuri, et al., "Mapping Artificial Neural Networks to a Tree Shape Neurocomputer", Microprocessors and Microsystems, 1996, 10 pages.
EP 16899902.7—Summons to Attend Oral Proceedings Pursuant to Rule 115(1) EPC, mailed Sep. 9, 2020, 12 pages.
CN 201610283838.5—Office Action, mailed Aug. 5, 2020, 13 pages. (no English translation).
Yunji Chen, et al., "DaDianNao: A Machine-Learning Supercomputer", IEEE 2014, 14 pages.
PCT/CN2016/081088—International Search Report, mailed Feb. 8, 2017, 14 pages. (no English translation).
Jianzhong Lin, et al., "Financial Information Analysis", Published in Apr. 2015, ISBN: 978-7-313-12714-3, 7 pages. (no English translation).
CN202010164111.1—First Office Action mailed on Mar. 16, 2023, 12 pages. (With Brief English Explanation).
KR20187033948—Written Decision on Registration mailed on Mar. 23, 2023, 6 pages.
KR 10-2018-7033948—Office Action, mailed on Aug. 30, 2022, 60 pages.
EP 21179374.0—Extended European Search Report, mailed Dec. 23, 2021, 14 pages.
P. Kolinummi, et al., PARNEU: general-purpose partial tree computer, Microprocessors and Microsystems, 2000, IPC Business Press Ltd. London, GB, vol. 24, Nr: 1, 20 pages.
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, 14 pages.
S. Liu, et al., "Cambricon: An Instruction Set Architecture for Neural Networks", 2016 ACM/IEEE 43rd Annual International Symposium on Computer Architecture, Oct. 12, 2016, 13 pages.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
T. Luo, et al., "DaDianNao: A Neural Network Supercomputer", IEEE Transaction on Computers, vol. 66, No. 1, Jan. 2017, 16 pages.
T. Chen, et al., "DianNao: A Small-Footprint High-Throughput Accelerator for Ubiquitous Machine-Learning", ASPLOS 14, Proceedings of the 19th international conference on Architectural support for programming languages and operating systems, Feb. 24, 2014, 15 pages.
Y. Chen, et al., "DianNao Family: Energy-Efficient Hardware Accelerators for Machine Learning", Communications of the ACM, vol. 59, No. 11, Nov. 2016, 8 pages.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, 13 pages.
Z. Du, et al., "ShiDianNao: Shifting Vision Processing Closer to the Sensor", ISCA '15 Proceedings of the 42nd Annual International Symposium on Computer Architecture, Jun. 13, 2015, 13 pages.
X. Yang, et al., "Traffic Sign Recognition Research and Application Based on Convolutional Neural Network," Jul. 15, 2015, 5 pages. (with English Summary).
EP 16899902.7—Official Action ESR dated Feb. 24, 2020, 7 Pages.
EP16899907.7—Invitation to file Search Results or a Statement of Non-Availability pursuant to Rule 70b(1) EPC, mailed Dec. 3, 2019, 1 Page.

* cited by examiner

APPARATUS AND METHODS FOR TRAINING IN CONVOLUTIONAL NEURAL NETWORKS

CROSS-REFERENCE TO RELATED APPLICATION

This application is a continuation of U.S. patent application Ser. No. 16/174,165, filed Oct. 29, 2018, which is a Continuation in Part of International Application No. PCT/CN2016/081088, filed May 5, 2016, which claims priority to Foreign Application No. CN201610283838.5, filed Apr. 29, 2016, the content of which application is hereby expressly incorporated herein by reference in its entirety.

TECHNICAL FIELD

The present disclosure generally relates to the technical field of artificial neural network, and specifically, relates to an apparatus and method for backpropagation of a convolutional artificial neural network.

BACKGROUND

Convolutional artificial neural networks have been widely applied in pattern recognition and image processing for its high efficiency. One known type of devices for convolutional artificial neural networks is to implement a general-purpose processor, which includes a general-purpose register file and a general-purpose functional unit to execute general purpose instructions to support algorithms for convolutional artificial neural networks. However, one of the defects of the method is lower operational performance of a single general-purpose processor which cannot meet performance requirements for usual multilayer neural network operations. When multiple general-purpose processors execute concurrently, the intercommunication among them also becomes a performance bottleneck.

Another known type of devices may involve a graphics processing unit (GPU), which includes a general-purpose register file and a general-purpose stream processing unit to execute general purpose single-instruction-multiple-data (SIMD) instructions to support the algorithms. However, since GPU only contains rather small on-chip caching, then model data (weight values) of a multilayer artificial neural network may be repeatedly moved from the off-chip, and off-chip bandwidth becomes a main performance bottleneck, causing huge power consumption.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for backpropagation in a convolutional artificial neural network. The example apparatus may include a direct memory access unit configured to receive input data from a storage device and a master computation module configured to select one or more portions of the input data based on a predetermined convolution window. Further, the example apparatus may include one or more slave computation modules respectively configured to convolute one of the one or more portions of the input data with one of one or more previously calculated first data gradients to generate a kernel gradient. The master computation module is further configured to update a prestored convolution kernel based on the kernel gradient.

Another example aspect of the present disclosure provides an example method for backpropagation of a convolutional artificial neural network. The example method may include receiving, by a direct memory access unit, input data from a storage device and selecting, by a master computation module, one or more portions of the input based on a predetermined convolution window. The example method may further include convoluting, by one or more slave computation modules, one of the one or more portions of the input data with one of one or more previously calculated first data gradients to generate a kernel gradient. Further still, the example method may include updating, by the master computation module, a prestored convolution kernel based on the kernel gradient.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Figure 1:
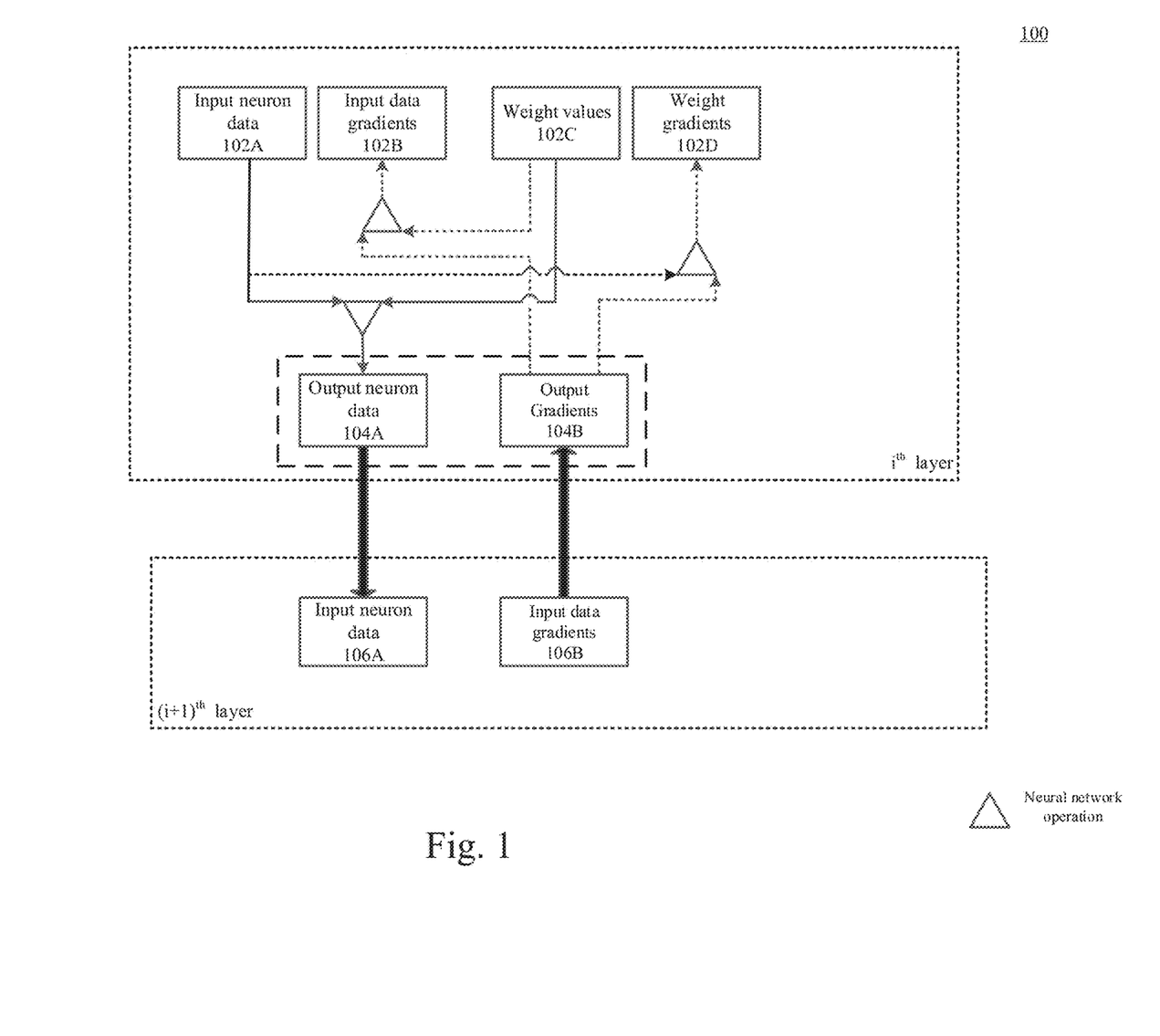
FIG. 1 is a block diagram illustrating an example forward propagation process and an example backpropagation process in a convolutional neural network.

FIG. 1 is a block diagram illustrating an example forward propagation process and an example backpropagation process (collectively, computing process 100) in a convolutional neural network. The computing process 100 is a merely example showing neural network operations that involve input data and weight values and is not limited to such operations. For example, other unshown neural network operations may include pooling operations, etc. Since convolution operation may be a major operation in the computing process 100, the illustrated multilayer neural network may be also referred to as a convolutional neural network.

As depicted, the example computing process 100 may be performed from the $i^{th}$ layer to the $(i+1)^{th}$ layer. The term "layer" here may refer to a group of operations, rather than a logic or a physical layer. A triangular-shaped operator (A as shown in FIG. 1) may indicate one or more neural network operations. Examples of the neural network operations may include an activation function, a bias operation, a matrix multiplication, a convolution operation, or any combination thereof. It is notable that the illustrated layers of operations may not be the first layer and the last layer of the entire computing process. Rather, the layers of operations may refer to any two consecutive layers in a neural network. As described below in greater detail, the computing process from the $i^{th}$ layer to the $(i+1)^{th}$ layer may be referred to as a forward propagation process; the computing process from $(i+1)^{th}$ layer to the $i^{th}$ layer may be referred to as a backward propagation (also may be interchangeably referred to as backpropagation) process.

The forward propagation process may start from input neuron data received at the $i^{th}$ layer (e.g., input neuron data 102A). Hereinafter, input neuron data may refer to the input data at each layer of operations, rather than the input data of the entire neural network. Similarly, output neuron data may refer to the output data at each layer of operations, rather than the output data of the entire neural network.

The received input neuron data 102A may be multiplied or convolved by one or more weight values 102C. The weight values 102C, stored as weight vectors, may also be referred to as a convolution kernel. The results of the multiplication or convolution may be transmitted as output neuron data 104A. In some examples, an activation function may be applied to the output neuron data 104A. The output neuron data 104A may be transmitted to the next layer (e.g., the $(i+1)^{th}$ layer) as input neuron data 106A. The forward propagation process may be shown as the solid lines in FIG. 1.

The backward propagation process may start from the last layer of the forward propagation process. For example, the backward propagation process may include the process from the $(i+1)^{th}$ layer to the $i^{th}$ layer. During the process, the input data gradients 106B may be transmitted to the $i^{th}$ layer as output gradients 104B. The output gradients 104B may then be multiplied or convolved by the input neuron data 102A to generate weight gradients 102D. Additionally, the output gradients 104B may be multiplied by the weight values 102C to generate input data gradients 102B.

In some examples where the $(i+1)^{th}$ layer is the last layer of the forward propagation process, the input data gradients 106B may be determined based on a difference between the input neuron data 106A and expected neuron data. The backward propagation process may be shown as the dotted lines in FIG. 1.

Figure 2:
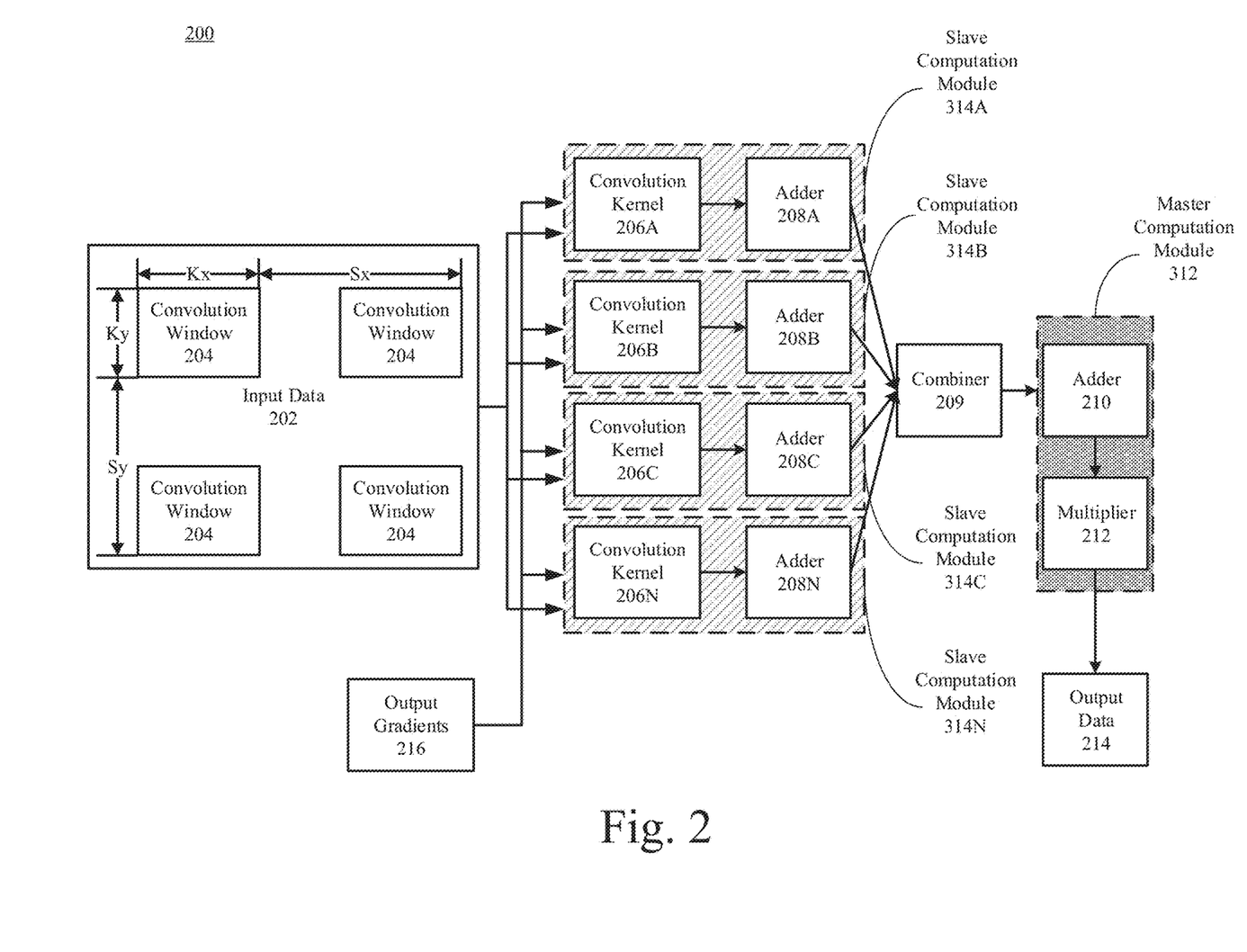
FIG. 2 is a block diagram illustrating an example backpropagation computing process in a convolutional neural network.

FIG. 2 is a block diagram illustrating an example backpropagation computing process in a convolutional neural network.

As depicted, input data 202 (e.g., input neuron data 102A) may be stored or presented in a two-dimensional format, e.g., W number of values horizontally and H number of values vertically, or stored as a two-dimensional vector. In some non-limiting examples, the input data 202 may refer to an image in a pattern recognition process executed in a convolutional neural network. As the size of the input data 202 may be large and may reduce overall system efficiency, the input data 202 may be segmented or divided into multiple subsets of data for further processing.

For example, a convolution window 204 may be predetermined for the segmentation or division. The convolution window 204 may be predetermined to be a fixed two-dimensional data range. That is, the data range in one dimension may be set to $K_x$ number of values and the data range in the other dimension may be set to $K_y$ number of values. In the example of a two-dimensional image, the convolution window 104 may refer to an area that includes $K_x$ number of horizontal pixels and $K_y$ number of vertical pixels.

The input data 202 within the convolution window 204 may be selected and transmitted, e.g., by a master computation module 312, to other components (e.g., slave computation modules 314) for further processing. The master computation module 312 and the slave computation modules 314 are described in greater detail in accordance with FIG. 3. Once the processing is completed, the convolution window 204 may be configured to slide or move by a predetermined distance, e.g., $S_x$ number of values in the one dimension or $S_y$ number of values in the other dimension, to identify another subset of the input data 202. The newly identified subset of the input data may be transmitted and similarly processed. In some examples, the convolution window 204 may be configured to slide in one dimension, e.g., sliding by $S_x$ number of values horizontally as shown in FIG. 1, until the input data 202 in this dimension has been processed. The convolution window 204 may then be configured to move in another dimension, e.g., moving by $S_y$ vertically as shown in FIG. 1.

In at least one example, $S_x$ may be set to a value that is greater than, equal to, or less than K. That is, when $S_x$ is greater than $K_x$, some portions of the input data 202 may not be selected and further transmitted. When $S_x$ is equal to $K_x$, all the input data 202 may be processed sequentially. When $S_x$ is less than $K_x$, some of the input data 202 may be processed more than once.

In the forward propagation process, a portion of the input data 202 identified by the convolution window 204 (hereinafter referred to as "$X_i$") may be transmitted to one or more slave computation modules 314 (e.g., 314A, 314B, 314C, . . . 314N). Each of the slave computation modules 314 may be configured to multiply the received Xi with a prestored convolution kernel (e.g., convolution kernel 206A). Convolution kernels 206A, 206B, 206C, . . . 206N may be collectively referred to as convolution kernels 206. The convolution kernel stored in each of the slave computation modules 314 may refer to a portion of the weight values 102C. In other words, the weight values 102C may be divided into portions and respectively transmitted to the slave computation modules 314 and stored as the convolution kernel 206. Thus, in some examples, each slave computation module may store a convolution kernel that may be different from other convolution kernels stored in other slave computation modules. As the convolution kernel 206N may be a portion of the weight values 102C, the convolution kernel 206N may be stored or formatted as a group of two-dimensional data, e.g., a two-dimensional vector. The multiplication results of the received Xi and the prestored convolution kernel may be output to a combiner 209 of an interconnection unit 308. The combiner 209 may be configured to add the multiplication results. An activation function may be further applied to the sum of the multiplication results, e.g., by a master computation module 312.

As described according to FIG. 1, the backpropagation process may include two sub-processes, i.e., calculating the weight gradients 102D and calculating the input data gradients 102B. In the sub-process of calculating the weight gradients 102D, each of the slave computation modules 314 may receive the portion of the input data 202 identified by the convolution window and output gradients 216. The output gradients 216 may refer to one or more data gradients calculated at and output from a lower layer of the backpropagation process. For example, the output gradients 216 may refer to the output gradients 104B from the $(i+1)^{th}$ layer in FIG. 1.

Each of the slave computation modules 314 may be configured to multiply the output gradients 216 with the selected portion of the input data 202 (e.g., $X_i$) to generate a kernel gradient. The multiplication may be represented as $X_i ds_i$, in which $X_i$ represents the selected portion of the input data 202 and $ds_i$ represents the output gradients 216. Further, with respect to different portions of the input data 202 selected based on adjusted convolution window 204, each of the slave computation modules 314 may calculate a respective kernel gradient. The master computation module 312 or the interconnection unit 308 may be configured to sum the respective kernel gradients to generate a summed kernel gradient. The summed kernel gradient may be represented as $dw=\Sigma X_i ds_i$ and may be further processed by the master computation module 312.

The master computation module 312 may be configured to calculate a quadratic mean of the summed kernel gradient. The quadratic mean may be represented as $$\sqrt{\frac{\Sigma dw^2}{n}},$$

in which n may refer to a count of the slave computation modules 314. Further, the master computation module 312 may be configured to compare the quadratic mean to a predetermined threshold. If the quadratic mean is greater than the threshold, the master computation module 312 may be configured to calculate a scaled kernel gradient based on the threshold and the quadratic mean. For example, the scaled kernel gradient may be calculated in accordance with the following equation: $dw'=dw/c*t$, in which dw represents the summed kernel gradient, c represents the quadratic mean, t represents the predetermined threshold, and dw' represents the scaled kernel gradient. The weight values 102C and the convolution kernels 206 may be updated based on the scaled kernel gradients. That is, the master computation module 312 may be configured to add the scaled kernel gradients to the weight values 102C or the convolution kernels 206 to generate a new set of weight values. If the quadratic mean is less than the threshold, the master computation module 312 may be configured to add the summed kernel gradient to the weight values 102C and/or the convolution kernels 206 to generate a new set of weight values.

In the sub-process of calculating the input data gradients 102B, the slave computation modules 314 may be configured to multiply the output gradients 216 with each of the convolution kernels 206 respectively. The interconnection unit 308 may be configured to sum the respective multiplication results. The master computation module 312 may be configured to multiply the summed results with a derivative of an activation function. The activation function may be a sigmoid function, a tanh function, a relu function, and a softmax function.

For example, the input data gradients 102B may be calculated in accordance with the following equation: $dx=h(x)\Sigma w_i ds_i$, in which h(x) represents the derivative of the activation function, $w_i$ represents one of the convolution kernels 206, $ds_i$ represents the output gradients 216, and dx represents the input data gradients 102B.

Figure 3:
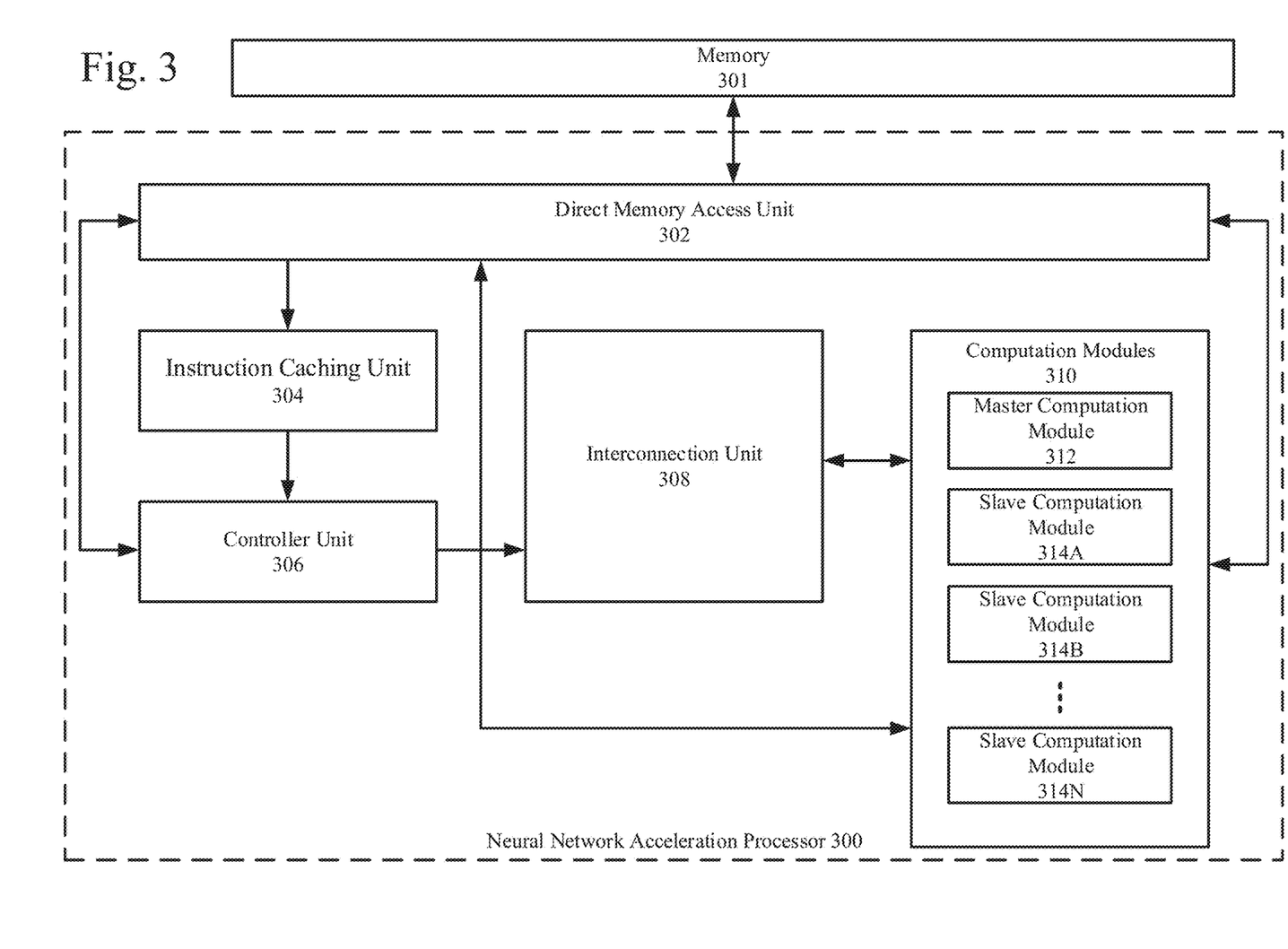
FIG. 3 is a block diagram illustrating an overall structure of a neural network acceleration processor by which backpropagation may be implemented in a convolutional neural network.

FIG. 3 is a block diagram illustrating an overall structure of a neural network acceleration processor 300 by which a backpropagation process may be implemented in a convolutional neural network.

As shown in FIG. 3, the neural network acceleration processor 300 includes an instruction caching unit 304, a controller unit 306, a direct memory access unit 302, an interconnection unit 308, a plurality of computation modules 310 that may include the master computation module 312, and the one or more slave computation modules 314 (e.g., 314A, 314B . . . 314N). Any of the above-mentioned components or devices may be implemented by a hardware circuit (e.g., application specific integrated circuit (ASIC)).

In some examples, the instruction caching unit 304 may be configured to receive or read instructions from the direct memory access unit 302 and cache the received instructions. The controller unit 306 may be configured to read instructions from the instruction caching unit 304 and decode one of the instructions into micro-instructions for controlling operations of other modules including the direct memory access unit 302, the master computation module 312, the slave computation modules 314, etc. In other words, the modules including the direct memory access unit 302, the master computation module 312, and the slave computation modules 314 may be configured to respectively perform the micro-instructions.

The direct memory access unit 302 may be configured to access an external address range (e.g., in an external storage device such as a memory 301) and directly read or write data into respective caching units in the computation modules 310.

In some example, an IO instruction may be pre-stored into a head address of the instruction caching unit 304. The IO instruction may instruct the direct memory access unit 302 to read the input data 202 from an external address space, e.g., the memory 301. The IO instruction may further instruct the direct memory access unit 302 to store the output data 214 back into the external space after completion of computation.

The controller unit 306 may be configured to read the IO instruction from the head address of the instruction caching unit 304. According to the decoded micro-instruction, the direct memory access unit 302 may be configured to read data relevant to the forward propagation (e.g., the input data 202, an interpolation table for the activation function, a bias value, parameters to configure the computation modules 310) and to store the above data to the master computation module 312.

The controller unit 306 may be further configured to read a next IO instruction from the instruction caching unit 304. According to the decoded micro-instructions of this IO instruction, the direct memory access unit 302 may be configured to read the one or more convolution kernels 206 from the memory 301. The convolution kernels 206 may be respectively transmitted to the slave computation modules 314.

Further still, the controller unit 306 may be configured to read a CONFIG instruction from the instruction caching unit 304 to configure the parameters for processing at the computation modules 310.

Once the computation modules 310 are configured accordingly, the controller unit 306 may be configured to read a COMPUTE instruction. The master computation module 312 may be configured, according the decoded micro-instruction of the COMPUTE instruction, to select a portion of the input data 202 based on the convolution window 204. Further, the master computation module 312 may transmit the selected portion of the input data 202 (e.g., $X_i$) to the slave computation modules 314 via the interconnection unit 308. Further, the master computation module 312 may be configured to transmit the output gradients 216 to the slave computation modules 314.

In some examples, the COMPUTE instruction may be one of a convolution network sigmoid derivative instruction, a convolution network tanh derivative instruction, a convolution network relu derivative instruction, or a convolution softmax derivative instruction.

The convolution network sigmoid derivative instruction may include an address of the output gradients 216, a size of the output gradients 216, an address of the portion of the convolution kernel 206, a size of the portion of the convolution kernel 206, and an indication of a derivative of a sigmoid function.

The convolution network tanh derivative instruction may include an address of the output gradients 216, a size of the output gradients 216, an address of the portion of the convolution kernel 206, a size of the portion of the convolution kernel 206, and an indication of a derivative of a tanh function.

The convolution network relu derivative instruction may include an address of the output gradients 216, a size of the output gradients 216, an address of the portion of the convolution kernel 206, a size of the portion of the convolution kernel 206, and an indication of a derivative of a relu function.

The convolution network softmax derivative instruction may include an address of the output gradients 216, a size of the output gradients 216, an address of the portion of the convolution kernel 206, a size of the portion of the convolution kernel 206, and an indication of a derivative of a softmax function.

In accordance with the decoded micro-instructions, each of the slave computation modules 314 may be configured to multiply the output gradients 216 with the selected portion of the input data 202 (e.g., $X_i$) to generate a kernel gradient. The multiplication may be represented as $X_i ds_i$, in which $X_i$ represents the selected portion of the input data 202 and $ds_i$ represents the output gradients 216. Further, with respect to different portions of the input data 202 selected based on adjusted convolution window 204, each of the slave computation modules 314 may calculate a respective kernel gradient. The kernel gradients may be summed up by the interconnection unit 308 and transmitted to the master computation module 312. The summed kernel gradient may be represented as $dw = \Sigma x_i ds_i$. The master computation module 312 may be configured to calculate a quadratic mean of the summed kernel gradients and calculate another set of weight values to update the weight values 102C based on the summed kernel gradients.

Additionally, the master computation module 312 may be configured to multiply the output gradients 216 with each of the convolution kernel 206 respectively. The master computation module 312 may be configured to multiply the output gradients 216 with each of the convolution kernel 206 respectively to generate the input data gradients 102B.

Formats of the abovementioned instructions are provided here in Table 1.

TABLE 1

| Instruction (Operation Code) | Register 0 | Register 1 | Register 2 | Register 3 | Register 4 | Register 5 | Register 6 |
|---|---|---|---|---|---|---|---|
| COMPUTE | Starting address of input data | Data length of input data | Starting address of convolution kernel | Data length of convolution kernel | Starting address of output gradients | Data length of output gradients | Address of interpolation table of activation function |
| IO | Address of external storage device | Data length | Address of internal storage device | | | | |

TABLE 1-continued

| Instruction (Operation Code) | Register 0 | Register 1 | Register 2 | Register 3 | Register 4 | Register 5 | Register 6 |
|---|---|---|---|---|---|---|---|
| NOP | | | | | | | |
| JUMP | Target address | | | | | | |
| MOVE | Address of input data | Data size | Address of output data | | | | |

Figure 4:
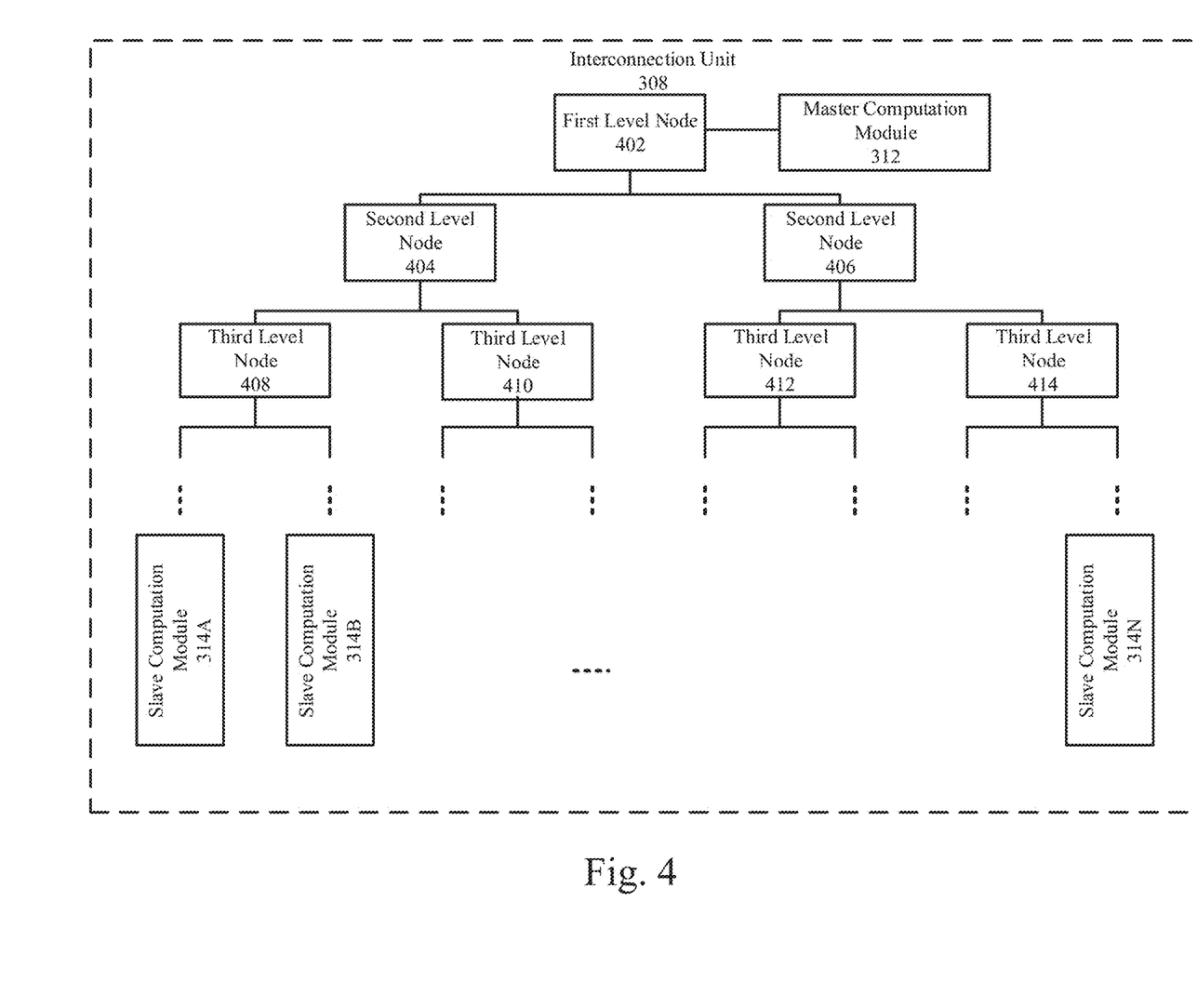
FIG. 4 is a block diagram illustrating an overall structure of an interconnection unit by which backpropagation may be implemented in a convolutional neural network.

FIG. 4 is a block diagram illustrating an overall structure of an interconnection unit by which backpropagation may be implemented in a convolutional neural network.

As depicted, the interconnection unit 308 may be structured as a binary tree that includes multiple levels (e.g., from top level to lower levels). Each level may include one or more nodes. Each node may be configured to send data to two nodes at a lower level. Further, each node may combine or add data received from two nodes at a lower level. The combined data may be transmitted to a node at a higher level. For example, the received data (e.g., a and b) from the two nodes at the lower level may be combined into a 2-dimensional vector (e.g., (a, b)) by the node at this level. The combined data, i.e., the 2-dimensional vector may be transmitted to a node at a higher level and further combined into a 4-dimensional vector. Alternatively, or additionally, each node may be configured to add data received from the two nodes at the lower level and the sum of the addition may be sent to the node at the high level.

As shown in FIG. 4, the nodes of the binary tree at the lowest levels may be connected to the slave computation modules 314. The data output from the slave computation modules 314 may be combined or summed at the multiple levels to generate a value or a vector at the first level node 402. The generated value or vector may be transmitted to the master computation module 312.

Figure 5:
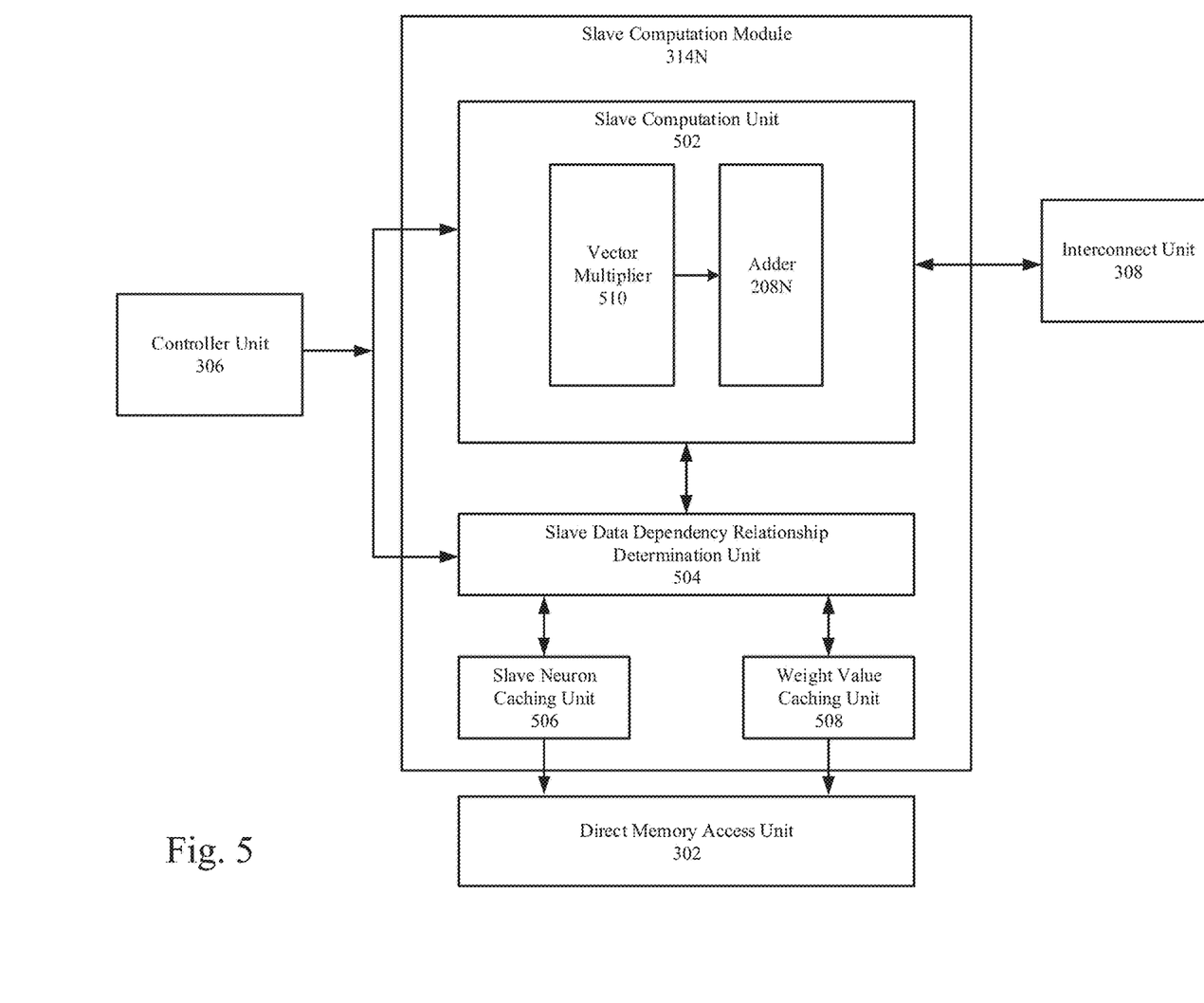
FIG. 5 is a block diagram illustrating the overall structure of a slave computation module by which backpropagation may be implemented in a convolutional neural network.

FIG. 5 is a block diagram illustrating the overall structure of a slave computation module 314N by which backpropagation may be implemented in a convolutional neural network.

As shown in FIG. 5, the slave computation module 314N comprises a slave computation unit 502, a slave data dependency relationship determination unit 504, a slave neuron caching unit 506, and a weight value caching unit 508. Hereinafter, a caching unit (e.g., a master neuron caching unit 606, a slave neuron caching unit 506, a weight value caching unit 508, etc.) may refer to an on-chip caching unit integrated in the neural network acceleration processor 300, rather than other storage devices in memory 301 or other external devices. In some examples, the on-chip caching unit may be implemented as an on-chip buffer, an on-chip Static Random Access Memory (SRAM), or other types of on-chip storage devices that may provide higher access speed than the external memory.

The slave data dependency relationship determination unit 504 may be configured to perform data access operations (e.g., reading or writing operations) on the caching units including the slave neuron caching unit 506 and the weight value caching unit 508 during the computation process. The slave data dependency relationship determination unit 504 may be configured to prevent conflicts in reading and writing of the data in the caching units including the slave neuron caching unit 506 and the weight value caching unit 508. For example, the slave data dependency relationship determination unit 504 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the slave data dependency relationship determination unit 504 may be stored in an instruction queue within the slave data dependency relationship determination unit 504. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The slave neuron caching unit 506 may be configured to store the selected portion of the input data 202 and the weight value caching unit 508 may be configured to store the convolution kernel 206N.

The slave computation unit 502 may be configured to receive micro-instructions decoded from a COMPUTE instruction from the controller unit 306 and perform arithmetical logic operations according to the micro-instructions. In some examples, the slave computation unit 502 may further include a vector multiplier 510 and the adder 208N.

In the sub-process of calculating the weight gradients 102D, the vector multiplier 510 may be configured to multiply elements in the output gradients 216 with elements the selected portion of the input data 202 (e.g., $X_i$). The results of the multiplication may be added by the adder 208N to generate a result of the vector multiplication as a kernel gradient. One or more kernel gradients generated by respective slave computation modules may be transmitted to the interconnection unit 308. The interconnection unit 308 or the master computation module 312 may be configured to sum the respective kernel gradients.

In the sub-process of calculating the input data gradients 102B, the vector multiplier 510 may be configured to multiply the output gradients 216 with each of the convolution kernel 206 respectively. For example, the input data gradients 102B may be calculated in accordance with the following equation: $dx = h(x)\Sigma w_i ds_i$, in which $h(x)$ represents the derivative of the activation function, $w_i$ represents one of the convolution kernels 206, $ds_i$ represents the output gradients 216, and $dx$ represents the input data gradients 102B. The vector multiplier 510 may be configured to calculate the multiplication between $w_i$ and $ds_i$. The multiplication results may be transmitted to the interconnection unit 308 that may be further configured to calculate a sum of the multiplication results, e.g., $\Sigma w_i ds_i$.

Figure 6:
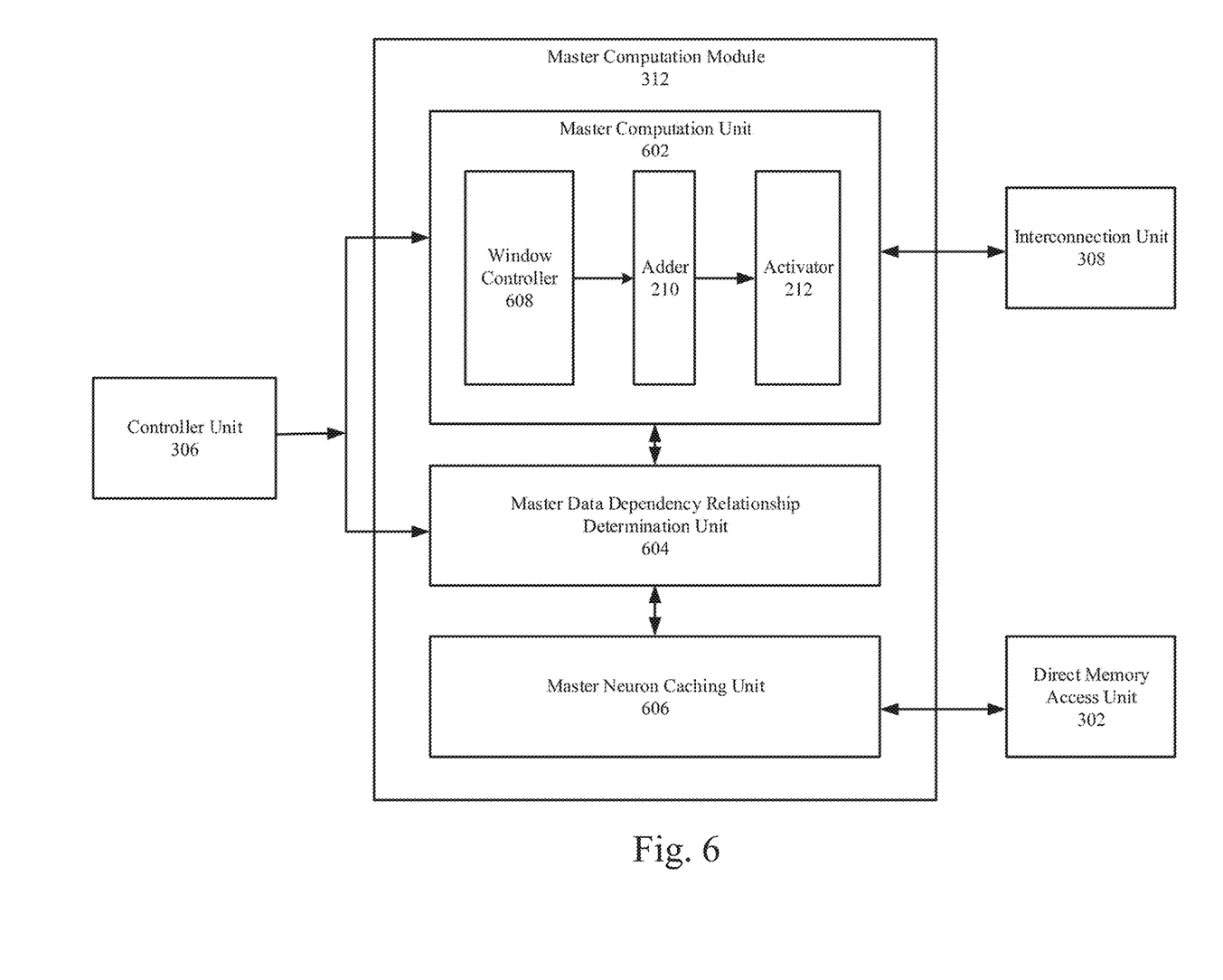
FIG. 6 is a block diagram illustrating the overall structure of a master computation module by which forward propagation may be implemented in a convolutional neural network.

FIG. 6 is a block diagram illustrating the overall structure of a master computation module by which forward propagation may be implemented in a convolutional neural network.

As shown in FIG. 6, the master computation module 312 may include a master computation unit 602, a master data dependency relationship determination unit 604, and a master neuron caching unit 606. The master computation unit 602 may further include a window controller 608, an adder 210, and an activator 212.

Similar to the slave data dependency relationship determination unit 504, the master data dependency relationship determination unit 604 may be configured to perform data access operations (e.g., reading or writing operations) on the caching units including the master neuron caching unit 606 during the computation process. The master data dependency relationship determination unit 604 may be configured to prevent conflicts in reading and writing of the data in the caching units including the master neuron caching unit 606. For example, the master data dependency relationship determination unit 604 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the master data dependency relationship determination unit 604 may be stored in an instruction queue within the master data dependency relationship determination unit 604. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The master neuron caching unit 606 may be configured to store the data related to the convolution window 204 including the data range, e.g., $K_x$ and $K_y$, the predetermined distance for sliding or moving the convolution window, e.g., $S_x$ number of values in the one dimension or $S_y$ number of values in the other dimension. Further, the master neuron caching unit 606 may be configured to store results calculated by the slave computation modules 314.

In the sub-process of calculating the weight gradients 102D, the one or more kernel gradients generated by the slave computation modules 314 may be transmitted to the master computation module 312. The adder 210 may be configured to add the respective kernel gradients to generate a summed kernel gradient. The summed kernel gradient may be represented as $dw = \Sigma x_i ds_i$.

Further, in calculating the weight gradients 102D, the window controller 608 may be configured to slide or move the convolution window 204 by the predetermined distance, e.g., $S_x$ number of values in the one dimension or $S_y$ number of values in the other dimension, to identify different subsets of the input data 202. In some examples, the convolution window 204 may be configured to slide in one dimension, e.g., sliding by $S_x$ number of values horizontally as shown in FIG. 1, until the input data 202 in this dimension has been processed. The convolution window 204 may then be configured to move in another dimension, e.g., moving by $S_y$ vertically as shown in FIG. 1.

In the sub-process of calculating the input data gradients 102B, the sum of the multiplication results, e.g., $\Sigma w_i ds_i$, may be received by the master computation module 312. The activator 212 may be configured to apply a derivative of the activation function to the sum of the multiplication results to generate the input data gradients 102B, e.g.: $dx = h(x)\Sigma w_i ds_i$, in which $h(x)$ represents the derivative of the activation function, $w_i$ represents one of the convolution kernels 206, $ds_i$ represents the output gradients 216, and $dx$ represents the input data gradients 102B.

In some examples, the one or more kernel gradients, the summed kernel gradient, the sum of the multiplication results, and other intermediate process results may be also stored in the master neuron caching unit 606.

Figure 7:
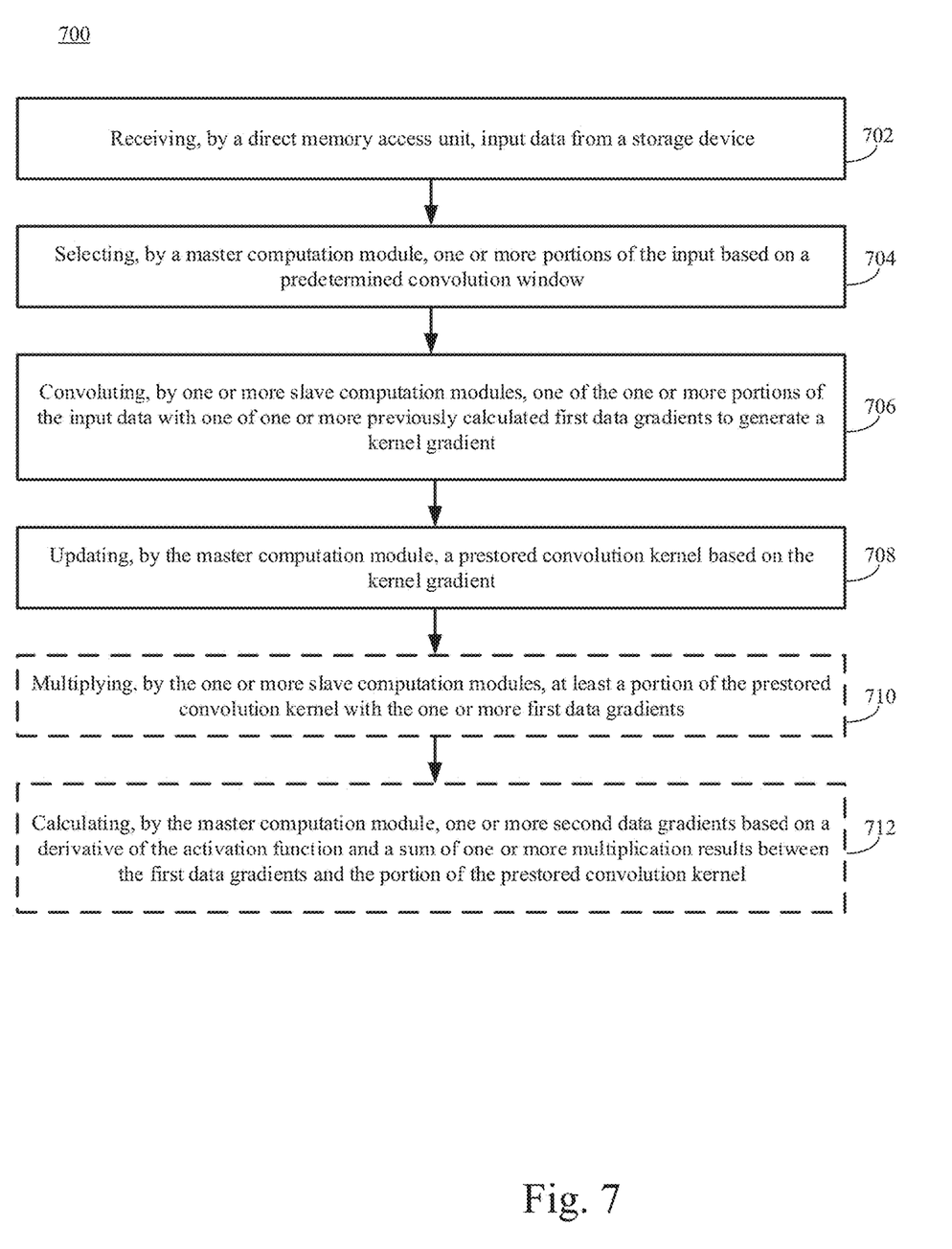
FIG. 7 is a flow chart of an example method for backpropagation in a convolutional neural network according to embodiments of the present disclosure.

FIG. 7 is a flow chart of an example method 700 for backpropagation in a convolutional neural network according to embodiments of the present disclosure. The example method 700 may be performed by one or more components as described in FIGS. 2, 3, 5, and 6. Optional operations may be indicated by dash-lined blocks.

At block 702, the example method 700 may include receiving, by a direct memory access unit, input data from a storage device. For example, the direct memory access unit 102 may be configured to receive the input data, e.g., input neuron data 102A, and the weight values 102C from the memory 301.

At block 704, the example method 700 may include selecting, by a master computation module, one or more portions of the input based on a predetermined convolution window. For example, the master computation module 312 may be configured, according the decoded micro-instruction of the COMPUTE instruction, to select a portion of the input data 202 based on the convolution window 204. Further, the master computation module 312 may transmit the selected portion of the input data 202 (e.g., $X_i$) to the slave computation modules 314 via the interconnection unit 308. Further, the master computation module 312 may be configured to transmit the output gradients 216 to the slave computation modules 314.

At block 706, the example method 700 may include convoluting, by one or more slave computation modules, one of the one or more portions of the input data with one of one or more previously calculated first data gradients to generate a kernel gradient. For example, each of the slave computation modules 314 may be configured to multiply the output gradients 216 with the selected portion of the input data 202 (e.g., $X_i$) to generate a kernel gradient.

At block 708, the example method 700 may include updating, by the master computation module, a prestored convolution kernel based on the kernel gradient. For example, the master computation module 312 or the interconnection unit 308 may be configured to sum the respective kernel gradients to generate a summed kernel gradient. The master computation module 312 may be configured to calculate a quadratic mean of the summed kernel gradient. Further, the master computation module 312 may be configured to compare the quadratic mean to a predetermined threshold. If the quadratic mean is greater than the threshold, the master computation module 312 may be configured to calculate a scaled kernel gradient based on the threshold and the quadratic mean. For example, the scaled kernel gradient may be calculated in accordance with the following equation: dw'=dw/c*t, in which dw represents the summed kernel gradient, c represents the quadratic mean, t represents the predetermined threshold, and dw' represents the scaled kernel gradient. The weight values 102C and the convolution kernels 206 may be updated based on the scaled kernel gradients. That is, the master computation module 312 may be configured to add the scaled kernel gradients to the weight values 102C or the convolution kernels 206 to generate a new set of weight values. If the quadratic mean is less than the threshold, the master computation module 312 may be configured to add the summed kernel gradient to the weight values 102C and/or the convolution kernels 206 to generate a new set of weight values.

At block 710, the example method 700 may include multiplying, by the one or more slave computation modules, at least a portion of the prestored convolution kernel with the one or more first data gradients. For example, the slave computation modules 314 may be configured to multiply the output gradients 216 with each of the convolution kernel 206 respectively. The interconnection unit 308 may be configured to sum the respective multiplication results.

At block 714, the example method 700 may include calculating, by the master computation module, one or more second data gradients based on a derivative of the activation function and a sum of one or more multiplication results between the first data gradients and the portion of the prestored convolution kernel. For example, the master computation module 312 may be configured to multiply the summed results with a derivative of an activation function. The activation function may be a sigmoid function, a tanh function, a relu function, and a softmax function.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for backpropagation of a convolutional neural network, comprising:
    a controller circuit configured to receive an instruction; and
    a computation circuit that includes a master computation circuit and a plurality of slave computation circuits, wherein the master computation circuit and the plurality of slave computation circuits are connected via an interconnection circuit,
    wherein each of the computation circuit, the master computation circuit, the plurality of slave computation circuits, and the interconnection circuit is an application specific integrated circuit, and
    wherein the master computation circuit is configured to:
        receive input data,
        divide the input data into a plurality of portions, and
        select a portion of the plurality of portions of the input data based on a predetermined convolution window, associated with a respective slave computation circuit of the plurality of slave computation circuits, in response to the instruction,
    wherein each slave computation circuit of the plurality of slave computation circuits is configured to respectively convolute the selected portion of the plurality of portions of the input data with one of one or more respectively calculated first data gradients to generate a kernel gradient,
    wherein the master computation circuit is further configured to update a prestored convolution kernel based on the kernel gradient,
    wherein the master computation circuit is further configured to calculate one or more second data gradients based on a derivative of an activation function and a sum of one or more multiplication results between the first data gradients and the portion of the prestored convolution kernel, and
    wherein the activation function is a function selected from the group consisting a sigmoid function, a tanh function, a relu function, and a softmax function.

2. The apparatus of claim 1, wherein each slave computation circuit of the plurality of slave computation circuits is respectively configured to multiply at least a portion of the prestored convolution kernel with one or more first data gradients of the first data gradients.

3. The apparatus of claim 1, wherein the interconnection circuit is configured to sum one or more kernel gradients respectively generated by the plurality of slave computation circuits to generate a summed kernel gradient.

4. The apparatus of claim 3, wherein the master computation circuit is further configured to calculate a quadratic mean of the summed kernel gradient.

5. The apparatus of claim 1, wherein the interconnection circuit is configured to channel data between the master computation circuit and the plurality of slave computation circuits.

6. The apparatus of claim 5, wherein the interconnection circuit is further configured to sum one or more multiplication results between the first data gradients and a portion of the prestored convolution kernel.

7. The apparatus of claim 1, wherein each of the plurality of slave computation circuits includes a slave neuron caching circuit configured to store one of the plurality of portions of the input data.

8. The apparatus of claim 1, wherein each slave computation circuit of the plurality of slave computation circuits includes a weight value caching circuit configured to store a portion of the prestored convolution kernel corresponding to the slave computation circuit.

9. The apparatus of claim 1, wherein the master computation circuit includes a window controller circuit configured to adjust the predetermined convolution window to select the portion of the plurality of portions of the input data.

10. The apparatus of claim 1, wherein the instruction is selected from the group consisting of a convolution network sigmoid derivative instruction, a convolution network tanh derivative instruction, a convolution network relu derivative instruction, and a convolution network softmax derivative instruction.

11. The apparatus of claim 10, wherein the instruction includes an address of the first data gradients, a size of the first data gradients, an address of a portion of the prestored convolution kernel, a size of the portion of the prestored convolution kernel, and an indication of a derivative of an activation function.

12. The apparatus of claim 10,
wherein the convolution network sigmoid derivative instruction includes an indication of a derivative of the sigmoid function,
wherein the convolution network tanh derivative instruction includes an indication of a derivative of the tanh function,
wherein the convolution network relu derivative instruction includes an indication of a derivative of the relu function, and
wherein the convolution network softmax derivative instruction includes an indication of a derivative of the softmax function.

13. A method for backpropagation of a convolutional neural network, comprising:
receiving, by a direct memory access circuit, input data from a storage device;
dividing, by a master computation circuit of a computation circuit, the input data into a plurality of portions;
selecting, by the master computation circuit of the computation circuit, a portion of the plurality of portions of the input data based on a predetermined convolution window, associated with a respective slave computation circuit of a plurality of slave computation circuits, in response to an instruction,
wherein the instruction includes an address of one or more previously calculated first data gradients, a size of first data gradients, an address of a portion of a prestored convolution kernel, a size of a portion of the prestored convolution kernel, and an indication of a derivative of an activation function;
convoluting, by each slave computation circuit of the plurality of slave computation circuits of the computation circuit, the selected portion of the plurality of portions of the input data with one of the one or more previously calculated first data gradients to generate a kernel gradient,
wherein the master computation circuit and the plurality of slave computation circuits are connected via an interconnection circuit;
wherein each of the computation circuit, the master computation circuit, the plurality of slave computation circuits, and the interconnection circuit is an application specific integrated circuit;
updating, by the master computation circuit of the computation circuit, the prestored convolution kernel based on the kernel gradient; and
calculating, by the master computation circuit, one or more second data gradients based on a derivative of an activation function and a sum of one or more multiplication results between the first data gradients and the portion of the prestored convolution kernel, wherein the activation function is a function selected from the group consisting a sigmoid function, a tanh function, a relu function, and a softmax function.

14. The method of claim 13, further comprising
multiplying, by each slave computation circuit of the plurality of slave computation circuits, at least a portion of the prestored convolution kernel with one or more first data gradients of the first data gradients.

15. The method of claim 13, further comprising
summing, by the interconnection circuit, one or more kernel gradients respectively generated by the plurality of slave computation circuits to generate a summed kernel gradient; and
calculating, by the master computation circuit, a quadratic mean of the summed kernel gradient respectively generated by the interconnection circuit.

16. The method of claim 13, further comprising
channeling data, by the interconnection circuit, between the master computation circuit and the plurality of slave computation circuits; and
calculating, by the interconnection circuit, a sum of one or more multiplication results between the first data gradients and the portion of the prestored convolution kernel.

17. The method of claim 13, further comprising
storing, by a slave neuron caching circuit of each slave computation circuit of the plurality of the slave computation circuits, one of the one or more portions of the input data; and
storing, by a weight value caching circuit of each slave computation circuit of the plurality of slave computation circuits, a portion of the prestored convolution kernel that correspond to each slave computation circuit of the plurality of slave computation circuits.

18. The method of claim 13, further comprising adjusting, by a window controller circuit of the master computation circuit, the predetermined convolution window to select the portion of the plurality of portions of the input data.

19. The method of claim 13, wherein the instruction is selected from the group consisting of a convolution network sigmoid derivative instruction, a convolution network tanh derivative instruction, a convolution network relu derivative instruction, and a convolution network softmax derivative instruction.

20. The method of claim 19,
wherein the convolution network sigmoid derivative instruction includes an indication of a derivative of the sigmoid function,
wherein the convolution network tanh derivative instruction includes an indication of a derivative of the tanh function,
wherein the convolution network relu derivative instruction includes an indication of a derivative of the relu function, and
wherein the convolution network softmax derivative instruction includes an indication of a derivative of the softmax function.

* * * * *